(12) United States Patent
Tsutsumi et al.

(10) Patent No.: US 11,841,457 B2
(45) Date of Patent: Dec. 12, 2023

(54) RADAR DEVICE, CONTROL CIRCUIT OF RADAR DEVICE, AND STORAGE MEDIUM OF RADAR DEVICE

(71) Applicant: MITSUBISHI ELECTRIC CORPORATION, Tokyo (JP)

(72) Inventors: Koji Tsutsumi, Tokyo (JP); Tatsuya Hagiwara, Tokyo (JP); Mitsuhiro Shimozawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 573 days.

(21) Appl. No.: 17/108,820

(22) Filed: Dec. 1, 2020

(65) Prior Publication Data

US 2021/0109193 A1   Apr. 15, 2021

Related U.S. Application Data

(63) Continuation of application No. PCT/JP2018/021947, filed on Jun. 7, 2018.

(51) Int. Cl.
*G01S 7/40* (2006.01)
*G01S 13/34* (2006.01)

(52) U.S. Cl.
CPC .............. *G01S 7/40* (2013.01); *G01S 7/4017* (2013.01); *G01S 13/341* (2013.01); *G01S 13/343* (2013.01)

(58) Field of Classification Search
CPC .... G01S 13/003; G01S 13/341; G01S 13/343; G01S 7/35; G01S 7/40; G01S 7/4004; G01S 7/4017; G01S 7/4069
See application file for complete search history.

(56) References Cited

U.S. PATENT DOCUMENTS 6,087,980 A * 7/2000 Saryo ...................... G01S 7/034
342/159
2021/0003692 A1 * 1/2021 Nohmi .................... G08G 1/052

FOREIGN PATENT DOCUMENTS

JP    2006-10404 A     1/2006
JP    2008-256562 A    10/2008
JP    2014-153182 A    8/2014

* cited by examiner

*Primary Examiner* — Timothy X Pham
(74) *Attorney, Agent, or Firm* — Birch, Stewart, Kolasch & Birch, LLP (57) ABSTRACT

A radar device includes a transmission module, a reception module, and a signal processing unit. The transmission module includes an RF signal source that generates a transmission chirp signal synchronized with a reference signal. The reception module includes an RF signal source that generates a reception chirp signal used as a reception local signal and synchronized with the reference signal. The reception module receives a reflected wave of the transmission chirp signal emitted from the transmission module, and mixes a received reception signal with the reception chirp signal. The signal processing unit detects a target based on a beat signal generated by the mixing by the reception module. The signal processing unit controls at least one of the RF signal sources such that between the transmission chirp signal and the reception chirp signal are output at timings shifted from each other, and corrects a change in a phase difference between the transmission module and the reception module, using a phase of a signal of a direct wave from the transmission module to the reception module.

19 Claims, 8 Drawing Sheets

CASE OF TRANSMISSION SIGNAL
AND RECEPTION LO SIGNAL
OUTPUT AT SAME TIMING($T_2=0$)

CASE OF TRANSMISSION SIGNAL
AND RECEPTION LO SIGNAL
OUTPUT WITH TIMING SHIFT($T_2<0$)

RADAR DEVICE, CONTROL CIRCUIT OF RADAR DEVICE, AND STORAGE MEDIUM OF RADAR DEVICE

CROSS-REFERENCE TO RELATED APPLICATION

This application is a continuation application of International Application PCT/JP2018/021947, filed on Jun. 7, 2018, and designating the U.S., the entire contents of which are incorporated herein by reference.

BACKGROUND OF THE INVENTION

1. Field of the Invention

The disclosure relates to a radar device that detects a target, i.e., a target object.

2. Description of the Related Art

A radar device emits a radio wave from a transmission antenna, and processes the reflected wave from the target received by a receiving antenna to measure the distance to, and the relative velocity of, the target. For example, an in-vehicle radar uses a chirp signal as a transmission signal, down-converts the reception signal using a local signal having a same frequency as the frequency of the transmission signal to obtain a beat signal, and then measures the distance to the target on the basis of the beat signal.

In this respect, use of a plurality of transmission antennas and a plurality of receiving antennas, or use of a plurality of transceiver antennas for transmitting/receiving signals, increases the equivalent aperture size of the set of antennas, which can in turn increase the angular resolution upon detection of a target. To achieve this, it is necessary to provide a known phase difference between received radio waves at the respective antennas, and the phase difference needs correcting when a change occurs in the phase difference due to manufacturing variation, aging, or a change in temperature.

As for a transmission antenna and a receiving antenna that are distant from each other, different signal sources may be used as the transmission signal source and the reception local signal source. A major issue with use of different signal sources presents is to prevent a change in the output phase difference between the signal sources. For example, Japanese Patent Application Laid-open No. 2006-10404 below discloses that a radar device using a plurality of antennas carries out a method for detecting the phase difference between antennas, using a reflected wave from the target.

The method of Japanese Patent Application Laid-open No. 2006-10404 described above uses a reflected wave from the target, and thus presents a problem of high restraint on correction performed during operation. Accordingly, it is desirable to correct a phase difference between antennas without using a reflected wave.

SUMMARY OF THE INVENTION

To solve the problem and achieve the object described above, a radar device according to the disclosure comprises: a transmission module including a first signal source to generate a transmission chirp signal synchronized with a reference signal. The radar device further comprises a reception module including a second signal source to generate a reception chirp signal synchronized with the reference signal, the reception module receiving a reflected wave of the transmission chirp signal emitted from the transmission module, and mixing the received reception signal with the reception chirp signal. The radar device further comprises a signal processing unit to detect a target on a basis of a beat signal generated by the mixing by the reception module. The signal processing unit controls at least one of the first signal source or the second signal source to maintain constant a frequency difference between the transmission chirp signal and the reception chirp signal. The signal processing unit corrects a change in a phase difference between the transmission module and the reception module, using a phase of a signal of a direct wave from the transmission module to the reception module.

DETAILED DESCRIPTION OF THE PREFERRED EMBODIMENTS

A radar device according to embodiments of the disclosure will be described in detail below with reference to the accompanying drawings. Note that these embodiments are not intended to limit the scope of the disclosure.

First Embodiment

Figure 1:
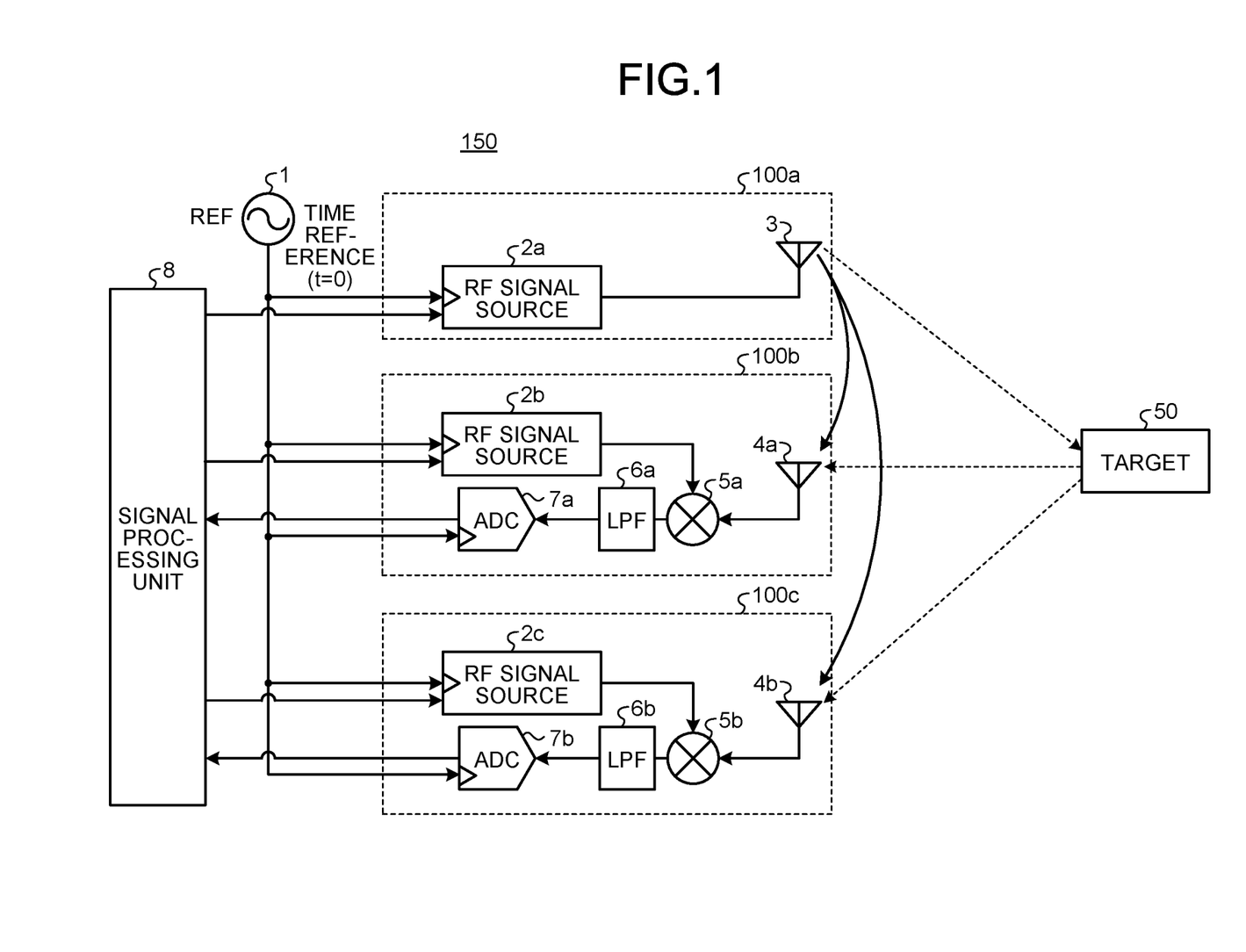
FIG. 1 is a block diagram illustrating an example configuration of a radar device according to a first embodiment.

FIG. 1 is a block diagram illustrating an example configuration of a radar device according to a first embodiment. A radar device 150 according to the first embodiment includes, as illustrated in FIG. 1, a reference signal source 1, one transmission module 100*a*, two reception modules 100*b* and 100*c*, and a signal processing unit 8. Note that the one transmission module is provided by way of example, and multiple transmission modules may be provided. The two reception modules are provided also by way of example, and one or three or more reception modules may be provided.

The reference signal source 1 is a circuit for generating a clock signal that serves as a reference signal for the transmission module 100a, the reception module 100b, and the reception module 100c to operate in synchronization with one another. The clock signal generated by the reference signal source 1 is distributed to the transmission module 100a and the reception modules 100b and 100c.

The transmission module 100a is a module that transmits a transmission signal. The transmission module 100a includes a radio frequency (RF) signal source 2a and a transmission antenna 3. The radio frequency (RF) signal source 2a, which is a first signal source, generates a signal synchronized with the clock signal output from the reference signal source 1. The transmission antenna 3 emits the transmission signal into the space.

The reception modules 100b and 100c are each a module that receives, from a target 50, a reflected wave of the transmission signal emitted into the space. Note that when there are direct waves from the transmission module 100a to the reception modules 100b and 100c as illustrated in FIG. 1, the reception modules 100b and 100c also receive these direct waves, and perform the processing as discussed hereinbelow.

The reception module 100b includes an RF signal source 2b, a receiving antenna 4a, a mixer 5a, a low-pass filter (LPF) 6a, and an analog-to-digital converter (ADC) 7a. The RF signal source 2b is a second signal source. The reception module 100c includes an RF signal source 2c, a receiving antenna 4b, a mixer 5b, an LPF 6b, and an ADC 7b. The RF signal source 2c is a second signal source.

The RF signal sources 2b and 2c each generate a reception local (LO) signal synchronized with the clock signal output from the reference signal source 1. The receiving antennas 4a and 4b each receive a direct wave from the transmission module 100a, and a reflected wave from the target 50. The mixers 5a and 5b mix the reception signals received through the receiving antennas 4a and 4b, with the respective reception LO signals to thereby generate beat signals each having the frequency difference between the corresponding reception signal and the corresponding reception LO signal. The LPF 6a allows only a low-frequency component of the output of the mixer 5a to pass therethrough. The ADC 7a performs a sampling operation in synchronization with the reference signal source 1 to convert the output of the LPF 6a into a digital signal. In addition, the LPF 6b allows only a low-frequency component of the output of the mixer 5b to pass therethrough. The ADC 7b performs a sampling operation in synchronization with the reference signal source 1 to convert the output of the LPF 6b into a digital signal.

The signal processing unit 8 controls parameters of a signal which each of the RF signal sources 2a, 2b, and 2c generates. The signal processing unit 8 performs signal-processing on the signals generated by the analog-to-digital conversion in the ADCs 7a and 7b. Note that the term "parameter" as used herein refers to an element for determination of the waveform of a chirp signal and the output timing of the chirp signal. Examples of the parameter include an initial value of the angular frequency upon a start of chirp operation, the delay time from a reference time, and a slope of the chirp signal.

For normal operation of the radar device 150, for example, it is necessary to provide a known relationship between the phase of the transmission signal emitted from the transmission antenna 3 and the phase of the reception LO signal for use in the down-conversion of the reception signal received by the receiving antenna 4a. Such transmission signal and reception LO signal are each generated by a circuit formed by, for example, a phase-locked loop (PLL). In the PLL, the phase relationship between the input reference signal and the output RF signal varies depending on the temperature and/or the like. It is thus necessary to monitor the phase difference between the phase of the transmission signal and the phase of the reception LO signal. Similarly, it is also necessary to monitor the phase difference between the RF signal source 2a and the RF signal source 2c. The present embodiment provides a calibration method for identifying the phase relationship of the signals between the transmission module and the reception module.

Figure 2:
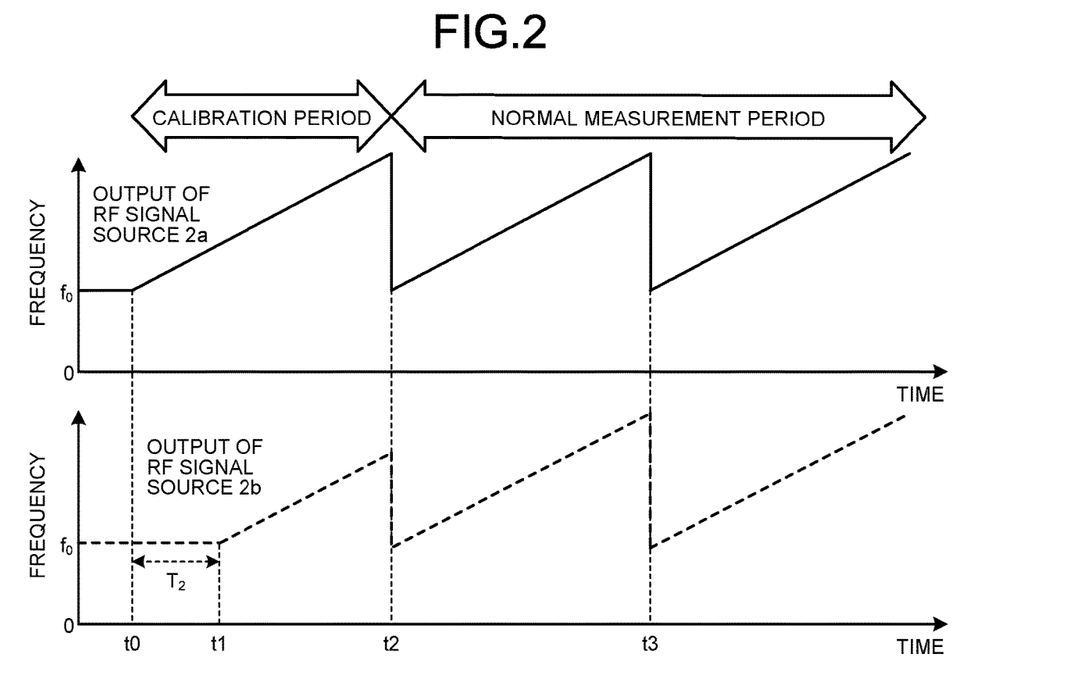
FIG. 2 is a set of time charts illustrating temporal change waveforms of outputs of respective RF signal sources illustrated in FIG. 1.

An operation of the radar device 150 according to the first embodiment will next be described with reference to FIGS. 1 and 2. FIG. 2 is a set of time charts illustrating temporal change waveforms of outputs of the RF signal sources 2a and 2b illustrated in FIG. 1.

The upper section of FIG. 2 illustrates the signal waveform of a signal output from the RF signal source 2a, using a solid line. As illustrated in FIG. 1, the output of the RF signal source 2a is the transmission signal output from the transmission antenna 3. In addition, the lower section of FIG. 2 illustrates the signal waveform of a signal output from the RF signal source 2b, using a broken line. As illustrated in FIG. 1, the output of the RF signal source 2b is the reception LO signal input to the mixer 5a. The signal generated by the RF signal source 2a and the reception LO signal generated by the RF signal source 2b are each, as illustrated in FIG. 2, a frequency-modulated chirp signal. That is, the RF signal source 2a generates a transmission chirp signal, and the RF signal source 2b generates a reception chirp signal used as the reception LO signal.

The chirp signal output from the transmission module 100a has a frequency that linearly increases from a frequency $f_0$ for a time period from time t0 to time t2, and then returns back to the initial frequency $f_0$ at time 2. The time period from time t0 to time t2 is one cycle. The frequency changes similarly also for the next cycle, i.e., for the time period from time t2 to time t3. This change pattern is further repeated after time t3. The waveform of a chirp signal over the one cycle is referred to as "chirp pulse" as appropriate.

Of the chirp pulses transmitted consecutively, the chirp pulse for the first cycle, i.e., the time period from time t0 to time t2, is used for calibration of the reception signal, that is, for correction to change in the phase difference of the reception signal. In addition, the chirp pulses in the second and later cycles, that is, after time t2, are used for normal measurement, that is, for detection of the target 50. In this sense, the time period from time t0 to time t2 is referred to herein as "calibration period", and the second and later cycles are together referred to herein as "normal measurement period".

As described above, in the first embodiment, the period for the processing period by the signal processing unit 8 is divided into "calibration period" for correction to change in the phase difference, and "normal measurement period" for detection of the target, that is, for measurement of the distance to, and the relative velocity of, the target. Note that although FIG. 2 illustrates the normal measurement period in two cycles, the normal measurement period may continue several cycles. Similarly, "calibration period" may continue several cycles rather than only one cycle.

As for the chirp signals during the calibration period, as illustrated in FIG. 2, time t1 the reception LO signal starts the frequency change lags, by $T_2$, behind time t0 the transmission signal starts the frequency change. That is, there is a time shift of $T_2$ between the timing of outputting of the chirp signal from the RF signal source $2a$ and the timing of outputting of the chirp signal from the RF signal source $2b$. For example, the clock signal from the reference signal source $1$ serving as the reference signal is delayed by a period that is an integer multiple of the period of that clock signal to thereby obtain that timing shift. Such delaying operation of $T_2$ causes a frequency difference between the reception signal and the reception LO signal that are mixed in the mixer $5a$ of the reception module $100b$. This enables the signal processing unit $8$ to detect a direct wave with high accuracy.

Next, the meaning of this "delaying operation" will be described using some mathematical formulae. First, let $v_1(t)$ denote the signal output from the RF signal source $2a$ and emitted from the transmission antenna $3$. The signal $v_1(t)$ can be expressed by the following formula.

[Formula 1]

$$V_1(t) = \sin\left[\left\{\omega_0 + \frac{\beta}{2}(t-\tau_1)\right\}(t-\tau_1)\right] \quad (1)$$

In Formula (1) above, $\omega_0$ represents the angular frequency at the start of chirp operation, $\beta$ represents the slope of the chirp signal, and $\tau_1$ represents the delay time from the time of outputting of the reference signal source $1$ until the signal $v_1(t)$ is emitted from the transmission antenna $3$.

In addition, let $v_2(t)$ denote the signal generated by the RF signal source $2b$ and input to the mixer $5a$. The signal $v_2(t)$ can be expressed by the following formula.

[Formula 2]

$$V_2(t) = \sin\left[\left\{\omega_0 + \frac{\beta}{2}(t-\tau_2-T_2)\right\}(t-\tau_2-T_2)\right] \quad (2)$$

In Formula (2) above, $\tau 2$ represents the delay time from the time of outputting of the reference signal source $1$ until the signal $v_2(t)$ is input to the mixer $5a$. Meanwhile, the delay time $T_2$, which is intentionally generated in the RF signal source $2b$, does not result from a variation of the RF signal source $2b$. The phase difference caused by variations of the RF signal source $2a$ and of the RF signal source $2b$ corresponds to a delay time difference $\tau_1-\tau_2$. Therefore, observation of the amount of change in the delay time difference $\tau_1-\tau_2$ enables determination of whether to correct or not the phase difference between the transmission module $100a$ and the reception module $100b$. A formula for obtaining the delay time difference $\tau_1-\tau_2$ will be derived below.

First, let $v_{2rx}(t)$ denote the signal emitted from the transmission antenna $3$ and directly received by the receiving antenna $4a$. The signal $v_{2rx}(t)$ can be expressed by the following formula.

[Formula 3]

$$V_{2rx}(t) = V_1(t+t_{d21}) = \sin\left[\left\{\omega_0 + \frac{\beta}{2}(t-\tau_1-t_{d21})\right\}(t-\tau_1-t_{d21})\right] \quad (3)$$

In the Formula (3) above, $t_{d21}$ represents the propagation delay time from the transmission antenna $3$ to the receiving antenna $4a$.

In addition, let $v_{2mix}(t)$ denote the reception beat signal that have been down-converted by the mixer $5a$ and passed through the LPF $6a$. The reception beat signal $v_{2mix}(t)$ can be expressed by the following formula.

[Formula 4]

$$V_{2mix}(t) = \cos\left[\beta(-\tau_1 - t_{d21} + \tau_2 + T_2)t + \left\{\omega_0 - \frac{\beta}{2}(\tau_1 + t_{d21} + \tau_2 + T_2)\right\}(-\tau_1 - t_{d21} + \tau_2 + T_2)\right] \quad (4)$$

From Formula (4) above, the phase $\varphi_{2adc}$ of the signal after the analog-to-digital conversion in the ADC $7a$ can be expressed by the following formula.

[Formula 5]

$$\phi_{2adc} = \left\{\omega_0 - \frac{\beta}{2}(\tau_1 + t_{d21} + \tau_2 + T_2)\right\}(-\tau_1 - t_{d21} + \tau_2 + T_2) \cong \omega_0(-\tau_1 + \tau_2 + T_2 - t_{d21}) \quad (5)$$

Assuming here that $\omega_0$, $T_2$, and $t_{d21}$ in Formula (5) above each have a known or non-variable value, Formula (5) above shows that the phase $\varphi_{2adc}$ is observed to thereby obtain the amount of change in the delay time difference $\tau_1-\tau_2$. Note that when the amount of change in the delay time difference $\tau_1-\tau_2$ is obtained, the phase difference between the output of the RF signal source $2a$ and the output of the RF signal source $2b$ can be corrected on the basis of that amount of change. The change in the phase difference can be corrected through the processing by the signal processing unit $8$.

Moreover, the phase difference between the output of the RF signal source $2a$ of the transmission module $100a$ and the output of the RF signal source $2c$ of the reception module $100c$ can be corrected by observation of the amount of change in the delay time difference $\tau_1-\tau_3$, using a similar technique. Note that $\tau_3$ represents the delay time from the time of outputting of the reference signal source $1$ until the signal output from the RF signal source $2c$ is input to the mixer $5b$.

The foregoing processing can identify the phase difference between the output of the transmission signal source and the output of the reception LO signal source to thereby correct the phase difference even when, for example, different signal sources, which are the transmission signal source and the reception LO signal source, are used because the transmission antenna and the receiving antenna are distant from each other. Such correction can accommodate a phase difference change due to manufacturing variation, aging, a change in temperature, or the like.

Note that FIG. 2 illustrates an example in which the output of the RF signal source $2b$ lags behind the output of the RF signal source $2a$, but the relationship therebetween does not matter as long as the delay time difference $\tau_1-\tau_2$ can be observed. Thus, contrary to the example of FIG. 2, the output of the RF signal source $2a$ may lag behind the output of the RF signal source $2b$, that is, the delay time $T_2$ may have a negative value. A similar concept also applies to the combination of the RF signal source $2a$ and the RF signal source $2c$.

In addition, a delay time $T_3$ of the signal generated by the RF signal source $2c$ may have either the same value as, or a different value from, the value of the delay time $T_2$. In fact, the delay time $T_3$ can be selected on the basis of the relationship between the position of the receiving antenna 4a of the reception module 100b and the position of the receiving antenna 4b of the reception module 100c. Specifically, the delay time $T_3$ is preferably selected such that the beat frequency after the down-conversion in the mixer 5a of the reception module 100b and the beat frequency after the down-conversion in the mixer 5b of the reception module 100c have approximately the same values.

Selection of such delay time $T_3$ enables signal processing parameters to match between the reception module 100b and the reception module 100c. This can reduce an error caused by measurement variation between the reception module 100b and the reception module 100c. In the example configuration of FIG. 1, a distance between the transmission antenna 3 and the receiving antenna 4b is larger than a distance between the transmission antenna 3 and the receiving antenna 4a. Thus, the delay time $T_3$ selected such that the beat frequencies of the respective reception modules 100b and 100c have approximately the same values is a value less than the value of the delay time $T_2$.

According to the radar device 150 of the first embodiment, as described above, at least one of the RF signal source 2a, the RF signal source 2b, and the RF signal source 2c is controlled through processing by the signal processing unit 8 such that the signal generated by the RF signal source 2a and the reception LO signals generated inside the respective RF signal sources 2b and 2c are output at their timings shifted from each other. This enables the phase difference between antennas, that is, between the transmission antenna and a receiving antenna, to be corrected without using a reflected wave.

Second Embodiment

Figure 3:
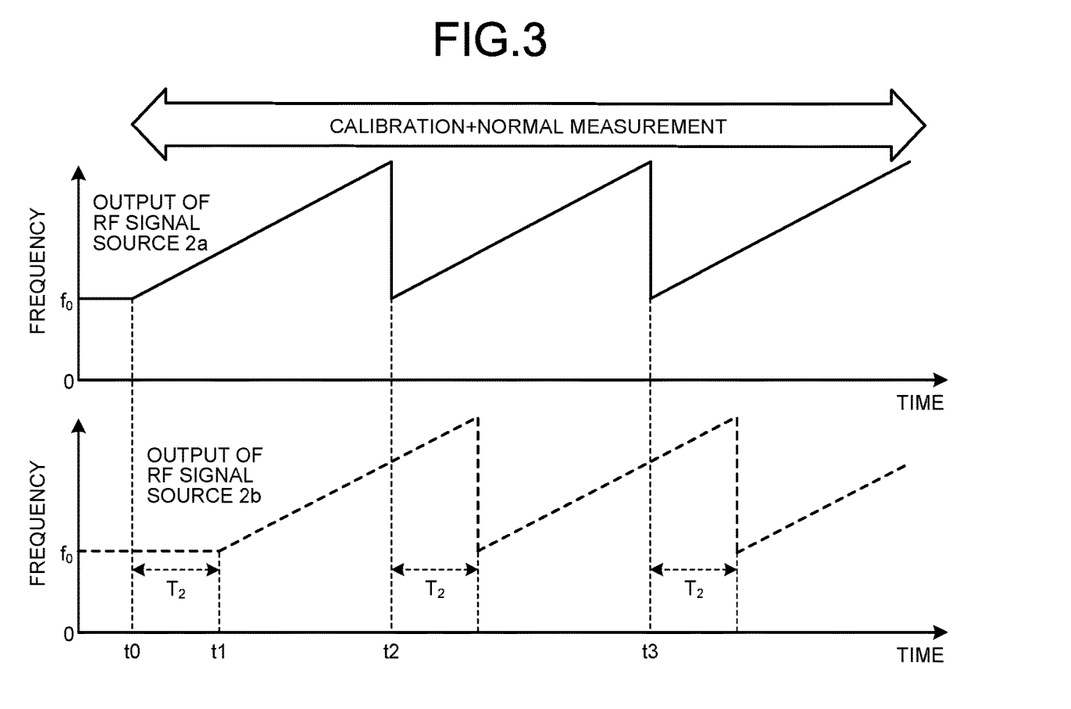
FIG. 3 is a set of time charts illustrating temporal change waveforms of outputs of respective RF signal sources in a second embodiment.
Figure 4:
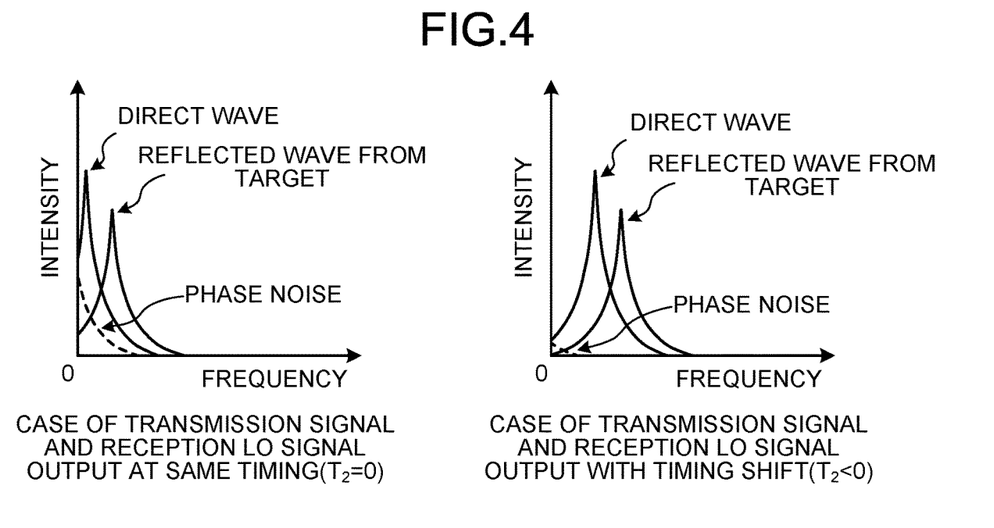
FIG. 4 is a set of diagrams for describing an advantage of the radar device in the second embodiment.

A radar device according to a second embodiment will next be described with reference to the drawings of FIGS. 3 and 4. FIG. 3 is a set of time charts illustrating temporal change waveforms of outputs of the RF signal sources 2a and 2b in the second embodiment. FIG. 4 is a set of diagrams for describing an advantage of the radar device in the second embodiment. Note that the functionality of the radar device according to the second embodiment can be implemented in a configuration identical or similar to the configuration of the first embodiment illustrated in FIG. 1.

The signal waveforms according to the second embodiment illustrated in FIG. 3 differ from the signal waveforms of the first embodiment illustrated in FIG. 2, in the output of the RF signal source 2b. Specifically, as illustrated in the lower section of FIG. 3, the difference is that all chirp pulses in the output of the RF signal source 2b lag behind the output of the RF signal source 2a. That is, the timing at which the reception LO signal is output from the RF signal source 2b is shifted to be delayed by the delay time $T_2$ from the timing at which the transmission signal is output from the RF signal source 2a. For the signal processing in the second embodiment, thus, the transmission signal and the reception LO signal maintain the same relationship therebetween, unlike the first embodiment in which the relationship varies from chirp-pulse to chirp-pulse. Thus, the second embodiment makes it possible to constantly monitor and correct the phase difference between the transmission module 100a and the reception module 100b while performing normal measurement, over the entire period of processing by the signal processing unit 8 without providing the calibration period and the normal measurement period separately.

For the radar device according to the second embodiment, the receiving antenna 4a receives the reception signal that is the direct wave from the transmission antenna 3 to the receiving antenna 4a for calculation of the phase difference between the transmission module 100a and the reception module 100b. The receiving antenna 4a receives the reception signal that is the reflected wave from the target 50 which the radar device measures. These two different reception signals have different frequencies from each other at a same measurement time after the down-conversion. Accordingly, the reception signal, which is the direct wave, and the reception signal, which is the reflected wave from the target 50, are separated from each other through processing by the signal processing unit 8, thereby making it possible to monitor the phase difference between the transmission module 100a and the reception module 100b, simultaneously with the detection of the target.

The technique of the second embodiment has the advantage that reception sensitivity increases. The left section of FIG. 4 illustrates spectra of the respective reception beat signals where the chirp signals, which are the transmission signal and the reception LO signal, are output at the same timing ($T_2$=0). The right section of FIG. 4 illustrates spectra where the chirp signals, which are the transmission signal and the reception LO signal, are output at timings shifted from each other ($T_2$<0). In these graphs, the solid lines represent the direct wave and the reflected wave from the target 50, and the broken line represents the alias component of phase noise from 0 [Hz].

The reception signal of the direct wave from the transmission antenna 3 to the receiving antenna 4a has, as illustrated in FIG. 4, a low frequency similar to the frequency of a direct current. As a result, the reception signal overlaps the alias component of phase noise from 0 [Hz], thereby degrading the signal-to-noise ratio (SNR). In contrast, when the timings at which the transmission signal and the reception LO signal are output are shifted from each other as in the second embodiment, the reception beat signals of the direct wave and the reflected wave from the target 50 have higher frequencies. As a result, the effect of the alias component from 0 [Hz] is reduced, and thus the SNR is increased. This is advantageous in improvement of reception sensitivity as compared to when $T_2$=0.

Third Embodiment

Figure 5:
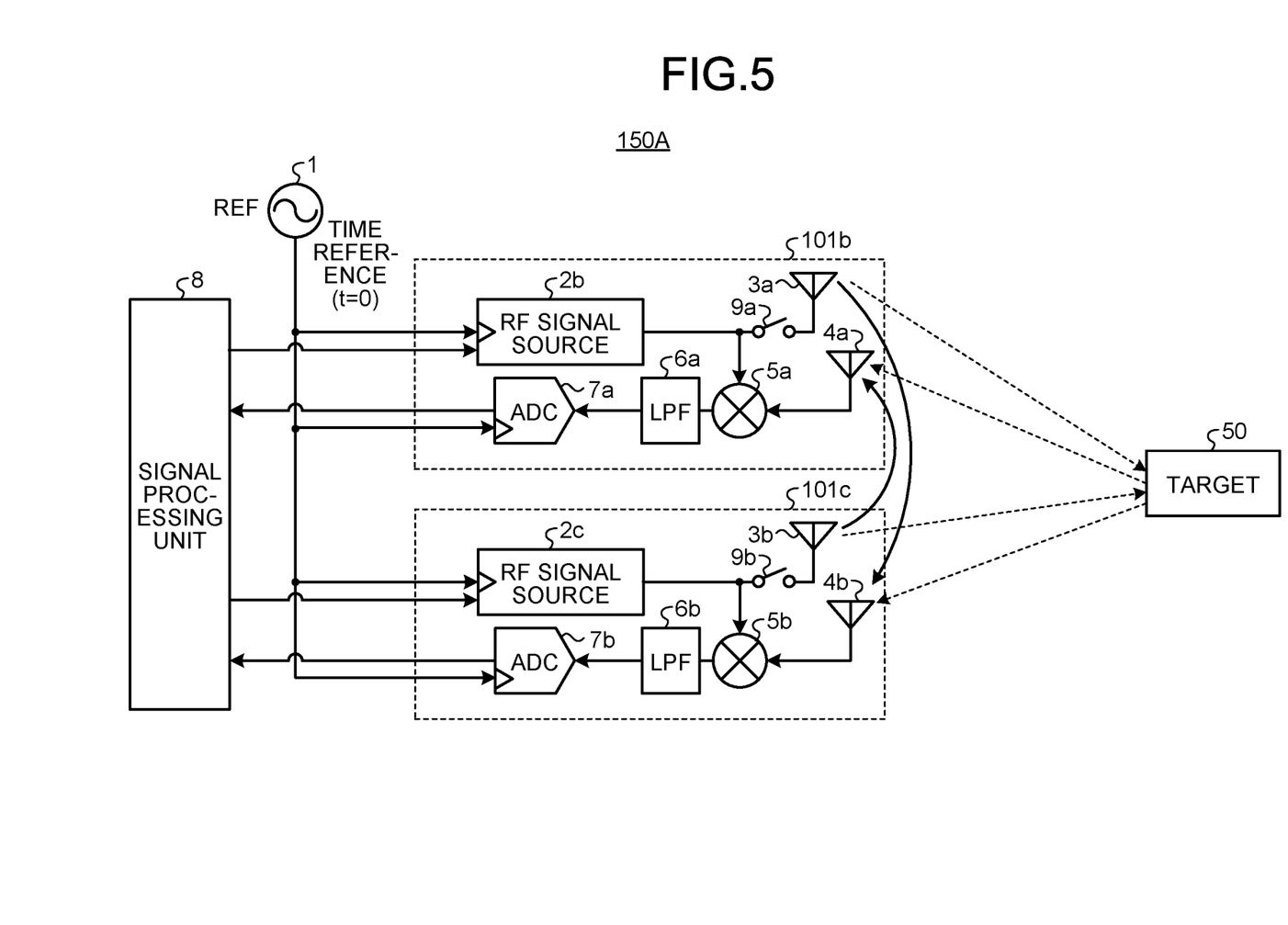
FIG. 5 is a block diagram illustrating an example configuration of a radar device according to a third embodiment.

FIG. 5 is a block diagram illustrating an example configuration of a radar device according to a third embodiment. A radar device 150A according to the third embodiment is configured to include two transceiver modules 101b and 101c in contrast to the radar device according to the first embodiment illustrated in FIG. 1 configured to include the one transmission module 100a and the two reception modules 100b and 100c. That is, in the third embodiment, the two transceiver modules 101b and 101c additionally have a capability to emit a transmission signal into the space, and the transmission module 100a is omitted.

The transceiver module 101b illustrated in FIG. 5 differs from the reception module 100b illustrated in FIG. 1 in further including a transmission antenna 3a and a switch 9a. The transmission antenna 3a emits a transmission signal into the space. The switch 9a selects whether to emit or not, that is, switches between emission and non-emission of, the transmission signal into the space. In addition, the transceiver module 101c differs from the reception module 100c illustrated in FIG. 1 in further including a transmission antenna 3b and a switch 9b. The transmission antenna 3b emits a transmission signal into the space. The switch 9b selects whether to emit or not, that is, switches between emission and non-emission of, the transmission signal into the space. Note that the other part of the configuration is identical or similar to the configuration of the first embodiment. Identical or similar components are designated by like reference characters, and duplicate description of the configuration will be omitted.

The radar device according to the first and second embodiments detects the phase difference between the transmission module and the reception module on the assumption that the propagation delay time between modules to be calibrated is constant. In contrast, the purport of the third embodiment is to detect the mutual phase difference between the transmission module and the reception module on an assumption that the propagation delay time between the transmission module and the reception module varies, too.

Figure 6:
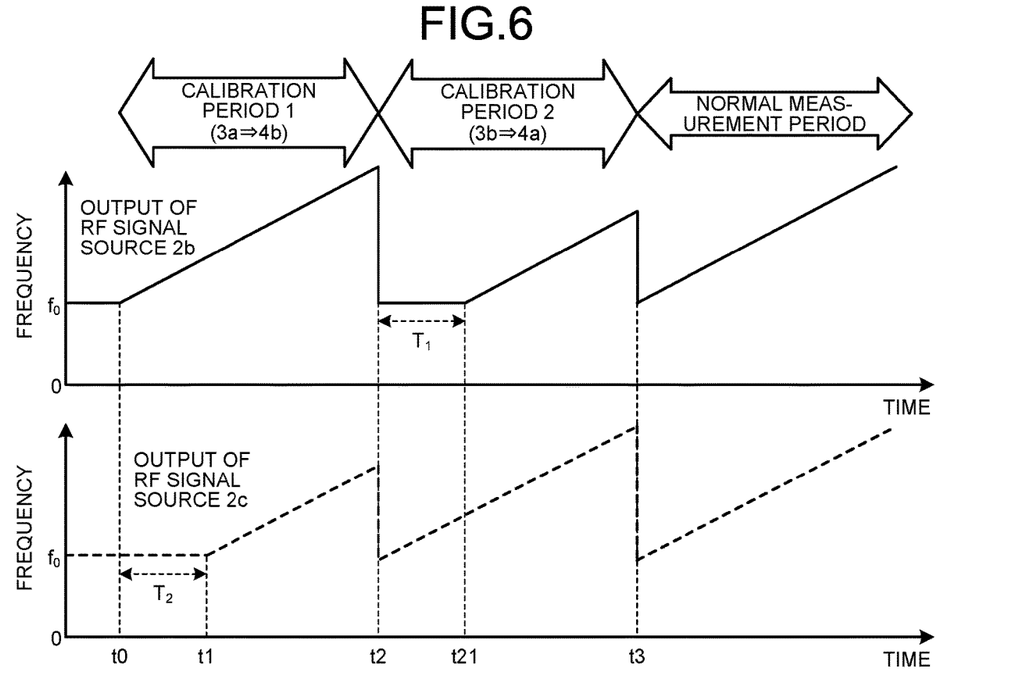
FIG. 6 is a set of time charts illustrating temporal change waveforms of outputs of respective RF signal sources illustrated in FIG. 5.

An operation of the radar device 150A according to the third embodiment will next be described with reference to FIGS. 5 and 6. FIG. 6 is a set of time charts illustrating temporal change waveforms of outputs of the RF signal sources 2a and 2b illustrated in FIG. 5.

The upper section of FIG. 6 illustrates, using a solid line, the waveform of the transmission signal output from the RF signal source 2b through the switch 9a and out of the transmission antenna 3a. As illustrated in FIG. 5, the output of the RF signal source 2b is the transmission signal output from the transmission antenna 3a of the transceiver module 101b. The signal output from the RF signal source 2b is also the reception LO signal input to the mixer 5a.

The lower section of FIG. 6 illustrates, using a broken line, the waveform of the transmission signal output from the RF signal source 2c through the switch 9b and out of the transmission antenna 3b. As illustrated in FIG. 5, the output of the RF signal source 2c is the transmission signal output from the transmission antenna 3b of the transceiver module 101c. The signal output from the RF signal source 2c is also the reception LO signal input to the mixer 5b.

The signal generated by the RF signal source 2b and the signal generated by the RF signal source 2c are each, as illustrated in FIG. 6, a frequency-modulated chirp signal. That is, the RF signal source 2b generates a chirp signal for use as the transmission signal and the reception LO signal, and the RF signal source 2c generates a chirp signal for use as the transmission signal and the reception LO signal. Note that, as used herein, the transceiver module 101b may be referred to as "first transceiver module", and the transceiver module 101c may be referred to as "second transceiver module". In addition, the signal generated by the RF signal source 2b may be referred to as "first chirp signal", and the signal generated by the RF signal source 2c may be referred to as "second chirp signal".

The transmission signal output from the RF signal source 2b has a frequency that linearly increases from a frequency $f_0$ for a time period from time t0 to time t2, and then returns back to the initial frequency $f_0$ at time t2. Meanwhile, the reception LO signal output from the RF signal source 2c has a frequency that is maintained at the frequency $f_0$ during a time period from time t0 to time t1, then linearly increases from the frequency $f_0$ for a time period from time t1 to time t2, and returns back to the initial frequency $f_0$ at time t2. The time period from time t0 to time t2, i.e., the first cycle, is a first calibration period. FIG. 6 illustrates the first calibration period as "calibration period 1". During calibration period 1, the transmission signal transmitted from the transmission antenna 3a is received by the receiving antenna 4b to correct the change in the phase difference. That is, calibration period 1 is a calibration period when the transceiver module 101b operates as the transmitter, and the transceiver module 101c operates as the receiver.

The time period from time t2 to time t3 following the first cycle is referred to as "second cycle". During the time period of the second cycle, the relationship between the signal output from the RF signal source 2b and the signal output from the RF signal source 2c is reversed. That is, the transmission signal output from the RF signal source 2c has a frequency that linearly increases from the frequency $f_0$ for the time period from time t2 to time t3, and then returns back to the initial frequency $f_0$ at time t3. Meanwhile, the reception LO signal output from the RF signal source 2b has a frequency that is maintained at the frequency $f_0$ during a time period from time t2 to time t21, then linearly increases from the frequency $f_0$ for a time period from time t21 to time t3, and returns back to the initial frequency $f_0$ at time t3. The second cycle is a second calibration period. FIG. 6 illustrates the second calibration period as "calibration period 2". During calibration period 2, the transmission signal transmitted from the transmission antenna 3b is received by the receiving antenna 4a to correct the change in the phase difference. That is, calibration period 2 is a calibration period when the transceiver module 101c operates as the transmitter, and the transceiver module 101b operates as the receiver. Note that the normal measurement period starts after calibration period 1 and calibration period 2. In addition, although FIG. 6 illustrates one cycle of the normal measurement period, the normal measurement period may continue several cycles. Similarly, "calibration period 1" and "calibration period 2" may each continue several cycles rather than only one cycle.

As for the chirp signals during calibration period 1, as illustrated in FIG. 6, time t1 the output of the RF signal source 2c, i.e., the reception LO signal, starts the frequency change lags, by $T_2$, behind time t0 the output of the RF signal source 2b, i.e., the transmission signal, starts the frequency change. That is, there is a time shift of $T_2$ between the timing of outputting of the chirp signal from the RF signal source 2b and the timing of outputting of the chirp signal from the RF signal source 2c.

In addition, as for the chirp signals during calibration period 2, as illustrated in FIG. 6, time t21 the output of the RF signal source 2b, i.e., the reception LO signal, starts the frequency change lags, by $T_1$, behind time t2 the output of the RF signal source 2c, i.e., the transmission signal, starts the frequency change. That is, there is a time shift of $T_1$ between the timing of outputting of the chirp signal from the RF signal source 2c and the timing of outputting of the chirp signal from the RF signal source 2b.

For example, the clock signal from the reference signal source 1 serving as the reference signal is delayed by a period that is an integer multiple of the period of the clock signal to thereby obtain those mutual timing shifts. The meaning of these "delaying operations" will be described using some mathematical formulae.

First, let $\varphi_{2adc}$ denote the phase of the signal in calibration period 1 generated by the analog-to-digital conversion in the ADC 7b of the transceiver module 101c. This phase $\varphi_{2adc}$ can be expressed by the following formula through deformation similar to the deformation in the first embodiment.

[Formula 6]

$$\phi_{2adc} = \left\{\omega_0 - \frac{\beta}{2}(\tau_1 + t_{d21} + \tau_2 + T_2)\right\}(-\tau_1 - t_{d21} + \tau_2 + T_2) \cong \qquad (6)$$
$$\omega_0(-\tau_1 + \tau_2 + T_2 - t_{d21})$$

In Formula (6) above, $\omega_0$ represents the angular frequency at the start of chirp operation, $\beta$ represents the slope of the chirp signal, $\tau_1$ represents the delay time from the time of outputting of the reference signal source 1 until the signal is emitted from the transmission antenna 3a, and $t_{d21}$ represents the propagation delay time from the transmission antenna 3a to the receiving antenna 4b.

Similarly, let $\varphi_{1adc}$ denote the phase of the signal in the calibration period 2 generated by the analog-to-digital conversion in the ADC 7a of the transceiver module 101b. This phase $\varphi_{1adc}$ can be expressed by the following formula similarly to Formula (6) above.

[Formula 7]

$$\phi_{1adc} = \left\{\omega_0 - \frac{\beta}{2}(\tau_2 + t_{d12} + \tau_1 + T_1)\right\}(-\tau_2 - t_{d12} + \tau_1 + T_1) \cong \qquad (7)$$
$$\omega_0(-\tau_1 - \tau_2 + T_1 - t_{d12})$$

In Formula (7) above, τ2 represents the delay time from the time of outputting of the reference signal source 1 until the signal is emitted from the transmission antenna 3b, and $t_{d12}$ represents the propagation delay time from the transmission antenna 3b to the receiving antenna 4a.

The parameters to detect are the delay time difference $\tau_1-\tau_2$ between the RF signal source 2b and the RF signal source 2c, the amount of change from the initial state of the propagation delay time $t_{d21}$ between the transmission antenna 3a and the receiving antenna 4b, and the amount of change from the initial state of the propagation delay time $t_{d12}$ between the transmission antenna 3b and the receiving antenna 4a.

Here, the amount Y of change from the initial state of the propagation delay time $t_{d12}$ can be expressed as $Y=t_{d21i}-t_{d21}$, where $t_{d21i}$ represents the initial value of the propagation delay time $t_{d21}$. Note that the initial value $t_{d12i}$ and the initial value $t_{d21i}$ of the propagation delay time $t_{d21}$ satisfy a relationship of $t_{d12i}=t_{d21i}$, where $t_{d12i}$ represents the initial value of the propagation delay time $t_{d12}$. Moreover, the propagation delay time $t_{d12}$ and the propagation delay time $t_{d21}$ satisfy a relationship of $t_{d12}=t_{d21}$. Accordingly, the amount of change from the initial state of the propagation delay time $t_{d12}$ is also Y. This leads to a relation expression of $Y=t_{d21i}-t_{d21}=t_{d12i}-t_{d12}$.

Furthermore, let X denote the delay time difference $\tau_1-\tau_2$ between the RF signal source 2b and the RF signal source 2c. Formulae (6) and (7) expressed using these X and Y are the following two formulae.

[Formula 8]

$$\phi_{2adc} \cong \omega_0(-X+T_2-t_{d21i}+Y) \qquad (8\text{-}1)$$

$$\phi_{1adc} \cong \omega_0(X+T_1-t_{d12i}+Y) \qquad (8\text{-}2)$$

In this regard, the values of $\omega_0$, $T_1$, $T_2$, $t_{d12i}$, and $t_{d21i}$ in Formulae (8-1) and (8-2) above are known, which therefore indicates that the phases $\varphi_{1adc}$ and $\varphi_{2adc}$ are observed to thereby obtain the amount of change in each of X and Y.

That is, use of the technique of the third embodiment determines not only the amount of change in the delay time difference between the RF signal sources 2b and 2c, but also the amount of change in the propagation delay time due to change in the distance between the transceiver modules 101b and 101c. Thus, a change in the phase difference between the transceiver modules 101b and 101c can be corrected with higher accuracy.

Fourth Embodiment

Figure 7:
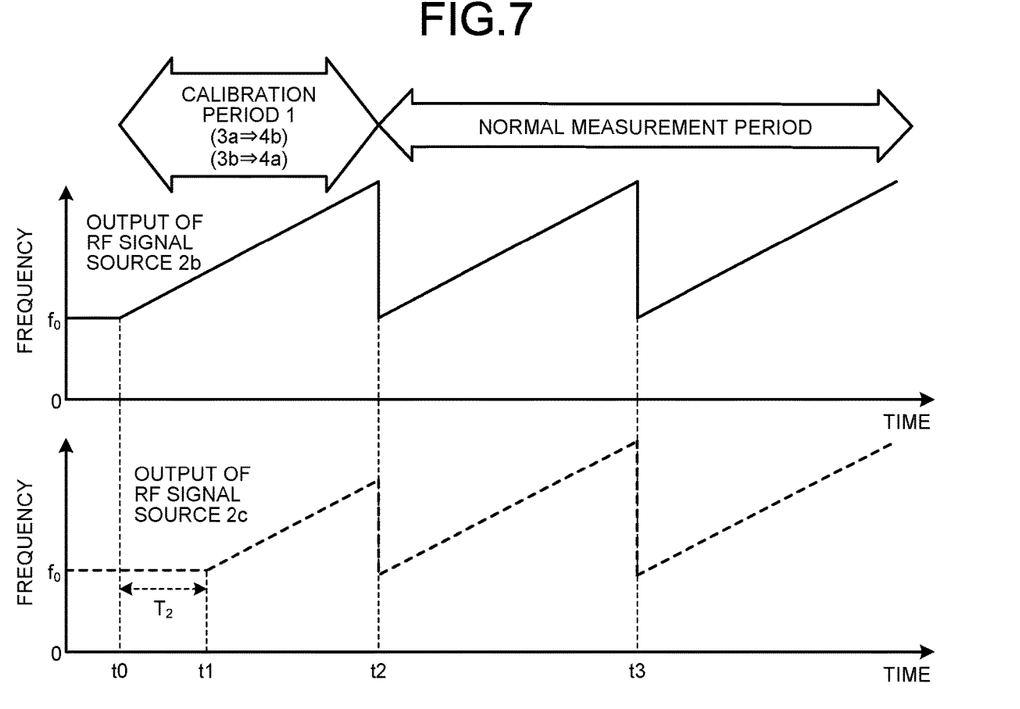
FIG. 7 is a set of time charts illustrating temporal change waveforms of outputs of respective RF signal sources in a fourth embodiment.

A radar device according to a fourth embodiment will next be described with reference to FIG. 7. FIG. 7 is a set of time charts illustrating temporal change waveforms of outputs of the RF signal sources 2b and 2c in the fourth embodiment. Note that the functionality of the radar device according to the fourth embodiment can be implemented in a configuration identical or similar to the configuration of the third embodiment illustrated in FIG. 5.

The signal waveforms according to the fourth embodiment illustrated in FIG. 7 differ from the signal waveforms of the third embodiment illustrated in FIG. 6 in that a radio wave is transmitted from the transmission antenna 3a of the transceiver module 101b to the receiving antenna 4b of the transceiver module 101c at the same time a radio wave is transmitted from the transmission antenna 3b of the transceiver module 101c to the receiving antenna 4a of the transceiver module 101b. That is, in the fourth embodiment, a time period is provided for the transceiver module 101b and the transceiver module 101c to transmit and receive a signal to and from each other, and a change in the phase difference is corrected on the basis of transmission-reception signals transmitted and received during this time period. This requires only one cycle for the calibration period, and can thus reduce the time necessary for calibration as compared to the third embodiment, thereby providing an advantage that the time period of the normal measurement is long as compared to the third embodiment.

Fifth Embodiment

Figure 8:
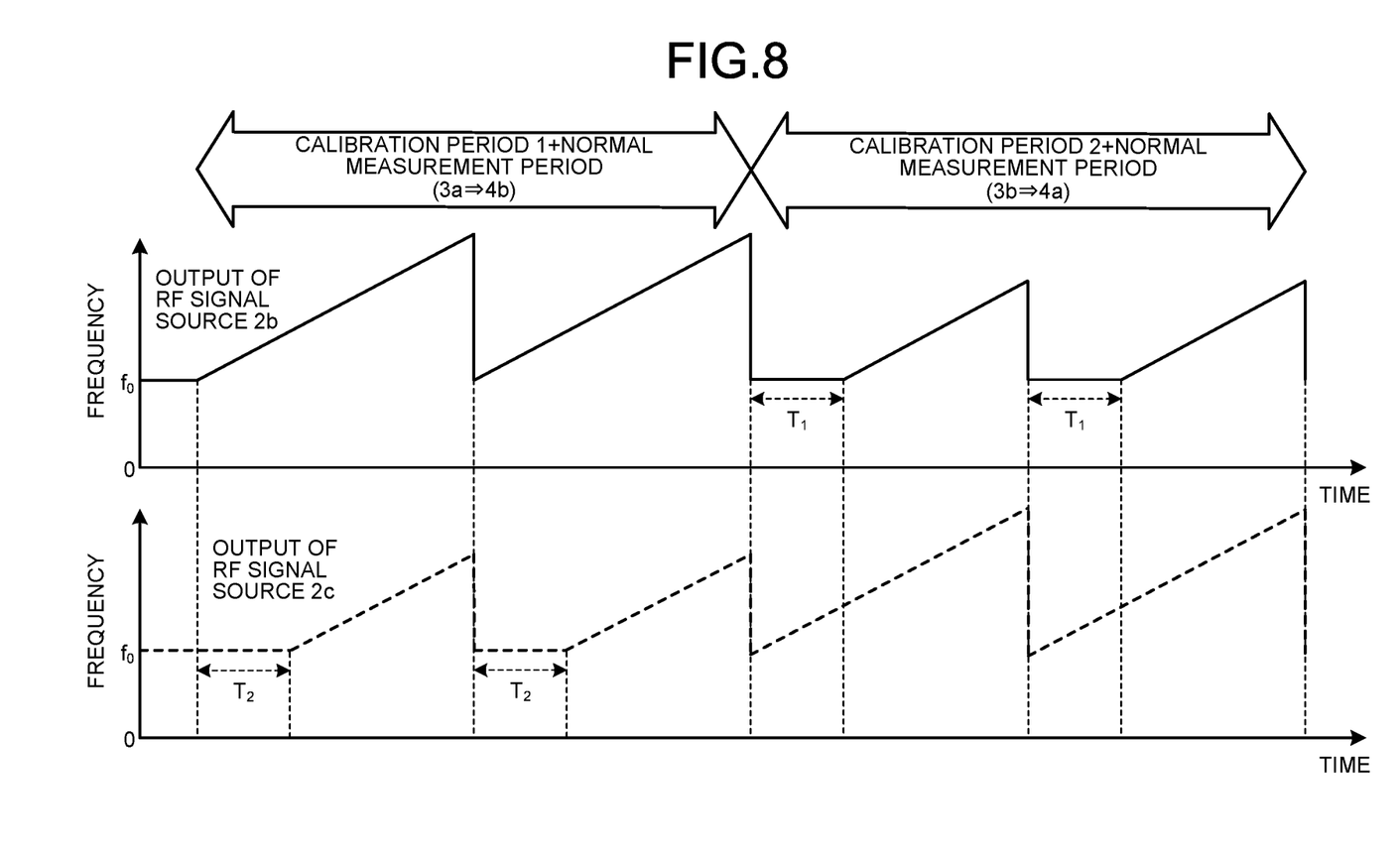
FIG. 8 is a set of time charts illustrating temporal change waveforms of outputs of respective RF signal sources in a fifth embodiment.

A radar device according to a fifth embodiment will next be described with reference to FIG. 8. FIG. 8 is a set of time charts illustrating temporal change waveforms of outputs of the RF signal sources 2b and 2c in the fifth embodiment. Note that the functionality of the radar device according to the fifth embodiment can be implemented in a configuration identical or similar to the configuration of the third embodiment illustrated in FIG. 5.

The signal waveforms according to the fifth embodiment illustrated in FIG. 8 differ from the signal waveforms of the third embodiment illustrated in FIG. 6 in that the outputs of the RF signal sources 2b and 2c are adjusted to allow a normal measurement to be performed during both calibration period 1 and calibration period 2. Note that the principle of the calibration during calibration periods 1 and 2 is described in the third embodiment, and description thereof will be omitted. In addition, the principle of the normal measurement is performed during calibration periods 1 and 2 is described in the second embodiment, and description thereof will be omitted.

According to the fifth embodiment, the period for calibration and the period for normal measurement are not separated, similarly to the second and third embodiments. This makes it possible to monitor the phase difference between the transceiver modules 101*b* and 101*c*, simultaneously with the detection of the target.

Sixth Embodiment

Figure 9:
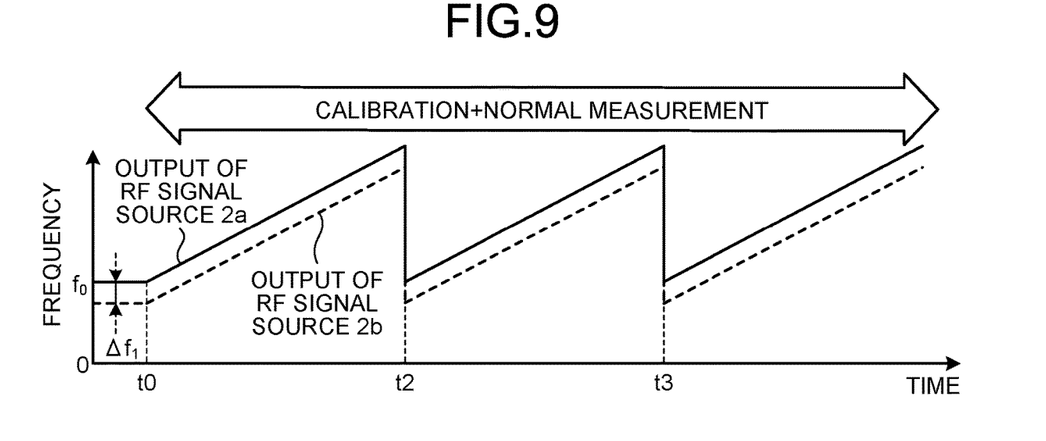
FIG. 9 is a time chart illustrating temporal change waveforms of outputs of respective RF signal sources in a sixth embodiment.

A radar device according to a sixth embodiment will next be described with reference to FIG. 9. FIG. 9 is a time chart illustrating temporal change waveforms of outputs of the RF signal sources 2*a* and 2*b* in the sixth embodiment. Similarly to FIGS. 2 and 3, the output of the RF signal source 2*a* is represented by a solid line, and the output of the RF signal source 2*b* is represented by a broken line. Note that the functionality of the radar device according to the sixth embodiment can be implemented in a configuration identical or similar to the configuration of the first embodiment illustrated in FIG. 1.

The signal waveforms according to the sixth embodiment illustrated in FIG. 9 differ from the signal waveforms of the second embodiment illustrated in FIG. 3 in that the chirp transmission signal output from the RF signal source 2*a* and the chirp reception LO signal output from the RF signal source 2*b* have their start frequencies shifted from each other without starting times of these chirp signals being shifted from each other. Specifically, the output of the RF signal source 2*b* is generated at a same timing and at a same slope of frequency as those of the output of the RF signal source 2*a*, but has a start frequency shifted therefrom by $\Delta f_1$. That is, the RF signal source 2*a* or the RF signal source 2*b* is controlled in such a manner as to maintain constant the frequency difference between the transmission signal output from the RF signal source 2*a* and the reception LO signal output from the RF signal source 2*b*. This can provide the same advantage as the advantage achieved by shifting the start timing of a chirp signal. Adjustment of the start timing of a chirp signal in units less than the period of the clock signal may result in a more complex circuit, a decrease in adjustment accuracy, and/or the like. Meanwhile, the frequency of a chirp signal is generally set using a fractional PLL, which enables high accuracy setting with a very fine resolution.

Although FIG. 9 illustrates the relationship between the transmission signal output from the RF signal source 2*a* and the reception LO signal output from the RF signal source 2*b*, it will be appreciated that the RF signal source 2*a* and the RF signal source 2*c* are operated with a similar frequency difference provided between the transmission signal output from the RF signal source 2*a* and the reception LO signal output from the RF signal source 2*c*.

Similarly to the second embodiment, use of the technique of the sixth embodiment makes it possible to constantly monitor and correct the phase difference between the transmission module 100*a* and the reception module 100*b* and the phase difference between the transmission module 100*a* and the reception module 100*c* during normal measurement without providing the calibration period and the normal measurement period separately. Note that unlike the technique of the second embodiment illustrated in FIG. 3 that permits no signal processing to be performed during the time period of the delay time $T_2$, use of a technique of shifting the frequency as in the sixth embodiment is advantageous in allowing signal processing to be performed even in the time period corresponding to the delay time $T_2$. That is, the technique of the sixth embodiment is advantageous in that the time period of the normal measurement is longer as compared to the second embodiment.

Note that although the sixth embodiment has been described in the context of the control technique to maintain constant the frequency difference between the output of the RF signal source 2*a* and the output of the RF signal source 2*b* being applied to the configuration of the first embodiment illustrated in FIG. 1, such control technique may also be applied to the third embodiment illustrated in FIG. 5.

Figure 10:
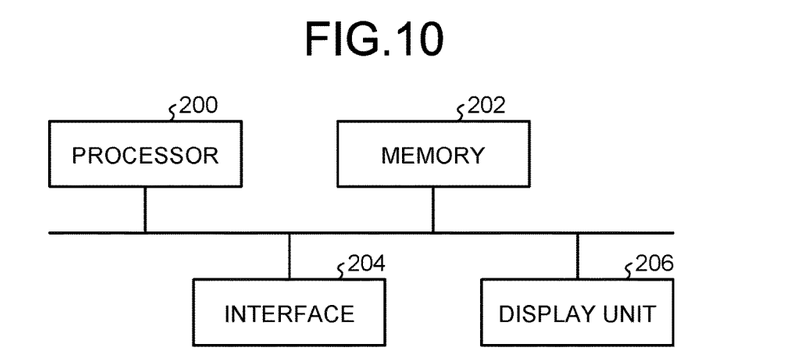
FIG. 10 is a block diagram illustrating an example of hardware configuration to implement the functionality of the signal processing unit in each of the first to sixth embodiments.
Figure 11:
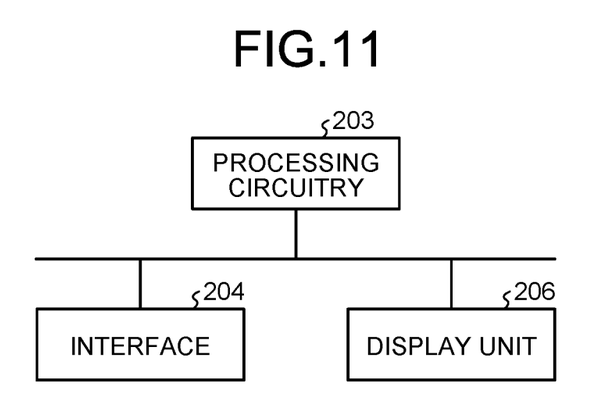
FIG. 11 is a block diagram illustrating another example of hardware configuration to implement the functionality of the signal processing unit in each of the first to sixth embodiments.

Finally, a hardware configuration to implement the functionality of the signal processing unit 8 in each of the first to sixth embodiments will be described with reference to the drawings of FIGS. 10 and 11. FIG. 10 is a block diagram illustrating an example of hardware configuration to implement the functionality of the signal processing unit 8 in each of the first to sixth embodiments. FIG. 11 is a block diagram illustrating another example of hardware configuration to implement the functionality of the signal processing unit 8 in each of the first to sixth embodiments.

In a case in which the functionality of the signal processing unit 8 in each of the first to sixth embodiments is implemented in software, the configuration may include, as illustrated in FIG. 10, a processor 200 that performs computation, a memory 202 that stores a program to be read by the processor 200, an interface 204 for inputting and outputting a signal, and a display unit 206 that displays a detection result.

The processor 200 may be computing means such as a computing unit, a microprocessor, a microcomputer, a central processing unit (CPU), or a digital signal processor (DSP). In addition, examples of the memory 202 include non-volatile or volatile semiconductor memories such as a random access memory (RAM), a read-only memory (ROM), a flash memory, an erasable programmable ROM (EPROM), and an electrically erasable programmable ROM (EEPROM) (registered trademark); a magnetic disk, a flexible disk, an optical disk, a compact disc, a MiniDisc, and a digital versatile disc (DVD).

The memory 202 stores a program for performing a function of the signal processing unit 8. The processor 200 provides and receives necessary information through the interface 204. The processor 200 executes a program stored in the memory 202, and can thus perform the calibration operation and the operation of detection of the target 50 described above. A result of computation of the processor 200 can be stored in the memory 202. In addition, a result of operation of the processor 200 can also be displayed on the display unit 206. Note that the display unit 206 may be provided outside the signal processing unit 8.

Alternatively, the processor 200 and the memory 202 illustrated in FIG. 10 may be replaced with a processing circuitry 203 of FIG. 11. The processing circuitry 203 is, for example, a single circuit, a set of multiple circuits, an application specific integrated circuit (ASIC), a field-programmable gate array (FPGA), or a combination thereof.

A radar device according to the disclosure provides an advantage of correcting a phase difference between antennas without using a reflected wave.

Note that the configurations described in the foregoing embodiments are merely examples. These configurations may be combined with a known other technology, and moreover, a part of such configurations may be omitted and/or modified without departing from the spirit.

What is claimed is:
1. A radar device comprising:
   a transmitter including a first signal source to generate a transmission chirp signal synchronized with a reference signal;
   a receiver including a second signal source to generate a reception chirp signal synchronized with the reference signal, the receiver receiving a reflected wave of the transmission chirp signal emitted from the transmitter, and mixing the received reception signal with the reception chirp signal; and a signal processor to detect a target on a basis of a beat signal generated by the mixing by the receiver, wherein the signal processor controls at least one of the first signal source or the second signal source to maintain constant a frequency difference between the transmission chirp signal and the reception chirp signal, and corrects a change in a phase difference between the transmitter and the receiver, using a phase of a signal of a direct wave from the transmitter to the receiver.

2. The radar device according to claim 1, wherein
the signal processor controls the at least one of the first signal source and the second signal source such that the transmission chirp signal and the reception chirp signal are output at timings shifted from each other to produce the constant frequency difference.

3. The radar device according to claim 2, wherein
a processing period for the signal processor is divided into a calibration period for correcting the change in the phase difference, and a normal measurement period for detecting the target, and
the signal processor corrects the change in the phase difference in the calibration period.

4. The radar device according to claim 2, wherein
the signal processor detects the target also in a time period during which to correct the change in the phase difference.

5. The radar device according to claim 3, wherein
the signal processor detects the target also in a time period during which to correct the change in the phase difference.

6. The radar device according to claim 1, wherein
the receiver is a transceiver module including the first signal source to also operate as the transmitter, and
the radar device includes at least two of the transceivers.

7. The radar device according to claim 2, wherein
the receiver is a transceiver module including the first signal source to also operate as the transmitter, and
the radar device includes at least two of the transceivers.

8. The radar device according to claim 6, wherein
a processing period for the signal processor is divided into a first calibration period, a second calibration period, and a normal measurement period, wherein, during the first calibration period, the change in the phase difference is corrected on the basis of a reception signal received by a second transceiver module, the reception signal received by the second transceiver module being a transmission signal transmitted from a first transceiver module, wherein, during the second calibration period, the change in the phase difference is corrected on the basis of a reception signal received by the first transceiver module, the reception signal received by the first transceiver module being a transmission signal transmitted from the second transceiver module, and wherein the normal measurement period is provided for detection of the target, and
the signal processor corrects the change in the phase difference during the first and second calibration periods.

9. The radar device according to claim 7, wherein
a processing period for the signal processor is divided into a first calibration period, a second calibration period, and a normal measurement period, wherein, during the first calibration period, the change in the phase difference is corrected on the basis of a reception signal received by a second transceiver module, the reception signal received by the second transceiver module being a transmission signal transmitted from a first transceiver module, wherein, during the second calibration period, the change in the phase difference is corrected on the basis of a reception signal received by the first transceiver module, the reception signal received by the first transceiver module being a transmission signal transmitted from the second transceiver module, and wherein the normal measurement period is provided for detection of the target, and
the signal processor corrects the change in the phase difference during the first and second calibration periods.

10. The radar device according to claim 6, wherein
a processing period for the signal processor is divided into a calibration period during which the change in the phase difference is corrected on the basis of transmission-reception signals transmitted and received between a first transceiver module and a second transceiver module, and a normal measurement period for detection of the target, and
the signal processor corrects the change in the phase difference during the calibration period.

11. The radar device according to claim 7, wherein
a processing period for the signal processor is divided into a calibration period during which the change in the phase difference is corrected on the basis of transmission-reception signals transmitted and received between a first transceiver module and a second transceiver module, and a normal measurement period for detection of the target, and
the signal processor corrects the change in the phase difference during the calibration period.

12. The radar device according to claim 6, wherein
the signal processor detects the target also in a time period during which to correct the change in the phase difference.

13. The radar device according to claim 7, wherein
the signal processor detects the target also in a time period during which to correct the change in the phase difference.

14. The radar device according to claim 8, wherein
the signal processor detects the target also in a time period during which to correct the change in the phase difference.

15. The radar device according to claim 9, wherein
the signal processor detects the target also in a time period during which to correct the change in the phase difference.

16. The radar device according to claim 10, wherein
the signal processor detects the target also in a time period during which to correct the change in the phase difference.

17. The radar device according to claim 11, wherein
the signal processor detects the target also in a time period during which to correct the change in the phase difference.

18. A control circuit of a radar device, the radar device comprising: a transmitter including a first signal source to generate a transmission chirp signal synchronized with a reference signal; and a receiver including a second signal source to generate a reception chirp signal synchronized with the reference signal, the receiver receiving a reflected wave of the transmission chirp signal emitted from the transmitter, and mixing the received reception signal with the reception chirp signal, wherein the control circuit detects a target on a basis of a beat signal generated by the mixing by the receiver, wherein the control circuit controls at least one of the first signal source or the second signal source to maintain constant a frequency difference between the transmission chirp signal and the reception chirp signal, and corrects a change in a phase difference between the transmitter and the receiver, using a phase of a signal of a direct wave from the transmitter to the receiver.

19. A non-transitory storage medium of a radar device, the radar device comprising: a transmitter including a first signal source to generate a transmission chirp signal synchronized with a reference signal; and a receiver including a second signal source to generate a reception chirp signal synchronized with the reference signal, the receiver receiving a reflected wave of the transmission chirp signal emitted from the transmitter, and mixing the received reception signal with the reception chirp signal, wherein the medium stores a program which, when executed by a processor, performs:

detecting a target on a basis of a beat signal generated by the mixing by the receiver; and controlling at least one of the first signal source or the second signal source to maintain constant a frequency difference between the transmission chirp signal and the reception chirp signal, and correcting a change in a phase difference between the transmitter and the receiver, using a phase of a signal of a direct wave from the transmitter to the receiver.

* * * * *